United States Patent
Yamaguchi et al.

(10) Patent No.: US 6,636,353 B2
(45) Date of Patent: Oct. 21, 2003

(54) OPTICAL ELEMENT CHANGE-OVER CONTROL APPARATUS AND MICROSCOPE USING THE SAME

(75) Inventors: Katsuyoshi Yamaguchi, Hino (JP); Mitsuhiko Saito, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 55 days.

(21) Appl. No.: 09/910,740

(22) Filed: Jul. 23, 2001

(65) Prior Publication Data

US 2002/0097486 A1 Jul. 25, 2002

(30) Foreign Application Priority Data

Jul. 25, 2000 (JP) .......................... 2000-224345

(51) Int. Cl.[7] ........................ G02B 21/06; G02B 21/00
(52) U.S. Cl. ...................... 359/381; 359/368; 359/387
(58) Field of Search ................ 359/368, 432, 359/380–384, 385–388, 821; 250/201.3, 231.18

(56) References Cited

U.S. PATENT DOCUMENTS

| | | | | |
|---|---|---|---|---|
| 4,653,878 A | * | 3/1987 | Nakasato et al. ........... 359/381 |
| 4,843,292 A | * | 6/1989 | Ono et al. ................... 318/606 |
| 5,396,063 A | * | 3/1995 | Ito et al. .................. 250/231.18 |
| 5,703,714 A | * | 12/1997 | Kojima ....................... 359/368 |
| 6,219,180 B1 | * | 4/2001 | Hasegawa et al. .......... 359/387 |

FOREIGN PATENT DOCUMENTS

JP          8-179218 A          7/1996

* cited by examiner

Primary Examiner—Thong Nguyen
(74) Attorney, Agent, or Firm—Frishauf, Holtz, Goodman & Chick, P.C.

(57) ABSTRACT

An optical element change-over control apparatus is provided that has an optical element change-over member capable of holding a plurality of optical elements and rotating alternatively to locate a specific optical element on an optical path. A control element drives a driving element to rotate the optical element change-over member and counts positioning signals delivered from a positioning detecting element during a time interval that elapses from the instant that a point of origin of the optical element change-over member is first detected by an origin detecting element until the point of origin of the optical element change-over member is secondly detected by the origin detecting element, thereby detecting the number of change-over stages of the optical element change-over member.

10 Claims, 6 Drawing Sheets

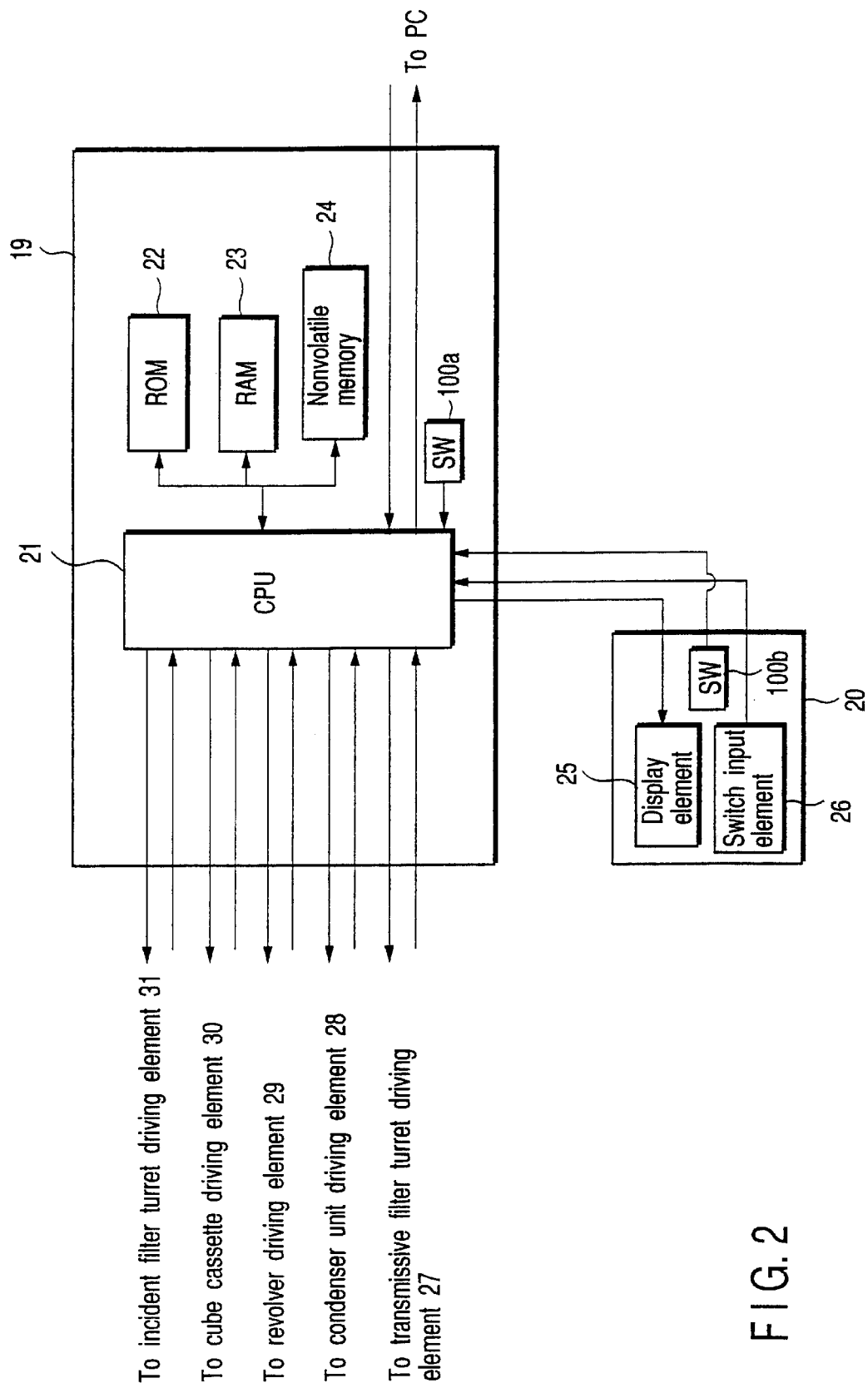
F I G. 2

OPTICAL ELEMENT CHANGE-OVER CONTROL APPARATUS AND MICROSCOPE USING THE SAME

CROSS-REFERENCE TO RELATED APPLICATIONS

This application is based upon and claims the benefit of priority from the prior Japanese Patent Application No. 2000-224345, filed Jul. 25, 2000, the entire contents of which are incorporated herein by reference.

BACKGROUND OF THE INVENTION

The present invention relates to an optical element change-over control apparatus for automatically changing necessary optical elements for various observations and an optical microscope using the control apparatus.

Various microscopic observation methods are used in the fields of medicine, biology, industries, etc. These observation methods, including the bright-field, dark-field, differential-interference contrast, and fluorescent observation methods, are changed over to one another by selecting necessary optical elements.

Further, a plurality of objective lens are used, and two or more types of objective lenses are required depending on the technical fields and applications. In order to meet this requirement with high efficiency, optical element change-over means, such as a revolver, cube cassette, filter turret, etc., are developed as component units that can be attached to a microscope. So-called system microscopes are prevailing microscopes that incorporate components selected according to the field of application and have the necessary number of change-over stages for the viewing method. One such system microscope may use, for example, a six-hole revolver, among other ones including 5-, 7-, and 8-hole revolvers. The cube cassette may, for example, be a 4-hole cube cassette selected among other ones including 6- and 8-hole cube cassettes. With this arrangement, the objective lens can be designed for 6-stage change-over, and the viewing method for 4-stage change-over. If the unit is replaced in the microscope of this type, the degree of freedom of microscope control changes, so that the control function must be changed in many cases. Further, the degree of freedom of the currently set unit, e.g., the number of holes of the revolver, should be learned in advance by any method. Described in Jpn. Pat. Appln. KOKAI Publication No. 8-179218, for example, is a microscopic system, which comprises motor-operated loading-unloading means for inserting into and removing various optical members from an optical path, detecting means for detecting any of the optical members in the optical path, input means for inputting control instructions from an operator, and control means. The control means receives information on the state of the optical member from the detecting means, and delivers a control command to the loading-unloading means to control the insertion of the optical member concerned in response to a control instruction inputted through the input means. The microscopic system further comprises setting means for optionally setting element data on various optical members, memory means capable of storing the element data on the optical members set by means of the setting means and holding the element data even in a power-off state, and display means for displaying the contents of the element data on the optical members. According to this microscopic system, optical members having new element data can be added to the optical member unit, and optimum control of a lighting system and an aiming system can be carried out with use of the added optical members. By retrieving the optical members, the environment of the microscope can be easily built up, and the resulting microscopic system can enjoy improved operating efficiency.

According to the microscopic system described in the aforesaid publication, however, the general control of the microscope is optimized in accordance with only element data on the objective lens that is attached to the revolver and element data on a filter that is attached to the cube cassette and applied to the viewing method. Thus, the control cannot cope with change of the number of change-over stages of the optical member unit, such as the number of holes of the revolver and the number of change-over stages of the cube cassette. If optical element change-over units including a revolver with a different number of holes or a cube cassette with a different number of change-over stages are attached so that the number of changeable objective lenses or the number of change-over stages of the viewing method is changed, therefore, it is necessary to change the control function and configuration.

The present invention has been contrived in consideration of these circumstances, and its object is to provide an optical element change-over control apparatus that is capable of carrying out smooth microscopic operation by detecting the number of change-over stages of optical element change-over units, such as a revolver, cube cassette, filter turret, etc., without changing the control function even in the case where the number of change-over stages of the change-over units is changed as the change-over units attached to the body of a microscope are replaced. And it is also an object of the invention to provide a microscope that utilizes such an optical element change-over control apparatus.

BRIEF SUMMARY OF THE INVENTION

In order to achieve the above object, an optical element change-over control apparatus according to a first aspect of the present invention comprises: an optical element change-over member capable of holding a plurality of optical elements and rotating alternatively to locate a specific optical element on an optical path; a driving element for rotating the optical element change-over member; a positioning detecting element for detecting the selected optical element being positioned so that the optical element stays in a predetermined position on the optical path and outputting positioning signals; an origin detecting element for detecting the point of origin of the optical element change-over member; and a control element for driving the driving element to rotate the optical element change-over member and counting the positioning signals delivered from the positioning detecting element during the time interval that elapses from the instant that the point of origin of the optical element change-over member is first detected by means of the origin detecting element until the point of origin of the optical element change-over member is secondly detected by means of the origin detecting element, thereby detecting the number of change-over stages of the optical element change-over member.

Further, a microscopic apparatus according to a second aspect of the invention uses an optical element change-over control apparatus, which comprises: an optical element change-over member capable of holding a plurality of optical elements and rotating alternatively to locate a specific optical element on an optical path; a driving element for rotating the optical element change-over member; a positioning detecting element for detecting the selected optical element being positioned so that the optical element stays in a predetermined position on the optical path and outputting positioning signals; an origin detecting element for detecting the point of origin of the optical element change-over member; and a control element for driving the driving element to rotate the optical element change-over member and counting the positioning signals delivered from the positioning detecting element during the time interval that elapses from the instant that the point of origin of the optical element change-over member is first detected by means of the origin detecting element until the point of origin of the optical element change-over member is secondly detected by means of the origin detecting element, thereby detecting the number of change-over stages of the optical element change-over member.

According to a third aspect of the invention, there is provided a method for detecting the number of change-over stages of an optical element change-over member capable of holding a plurality of optical elements and rotating alternatively to locate a specific optical element on an optical path, the method comprising: a member rotating step of driving a driving element to rotate the optical element change-over member; a first origin position detecting step of detecting the origin position of the optical element change-over member by means of an origin detecting element; a positioning signal detecting step of determining whether or not a positioning signal, indicative of the selected optical element being positioned so that the optical element stays in a predetermined position on the optical path, is detected after the origin position is detected and incrementing a count value indicative of the number of change-over stages of the optical element change-over member by one every time the positioning signal is detected; and a second origin position detecting step of determining whether or not the origin position of the optical element change-over member is detected again during the execution of the positioning signal detecting step and stopping the rotation of the optical element change-over member when the origin position is detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 2 is a diagram showing a control section and an operating section of the apparatus according to the first embodiment;

DETAILED DESCRIPTION OF THE INVENTION

Figure 1:
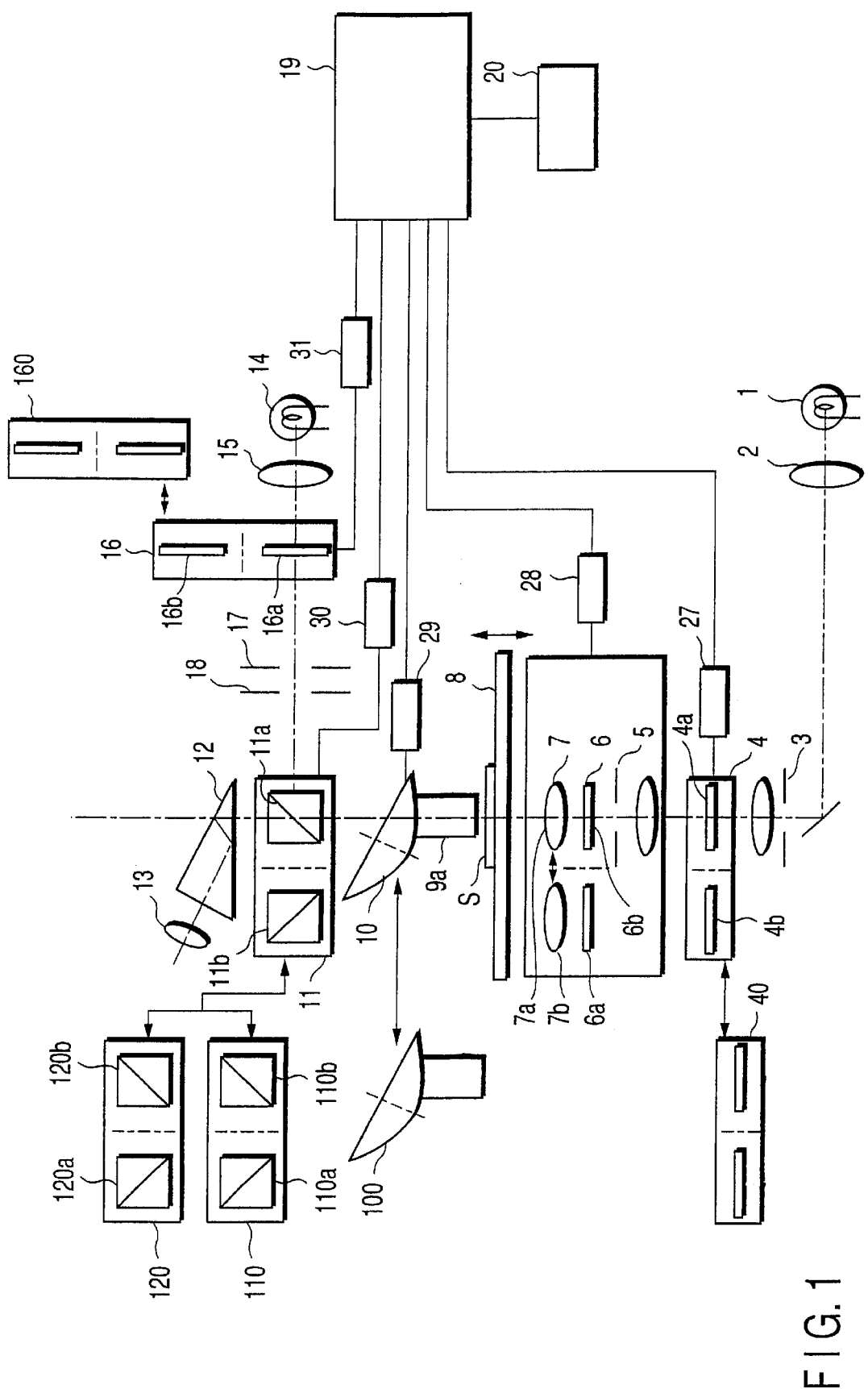
FIG. 1 is a diagram showing an outline of an apparatus according to a first embodiment of the present invention.

A first embodiment of the present invention will now be described with reference to FIGS. 1 and 2. In an optical system of a microscope, light from a light source 1 for transmissive illumination, e.g., a halogen lamp, is condensed by means of a collector lens 2 and transmitted through a transmissive field stop 3, and then lands on a filter turret 4 for transmission that can be inserted into and removed from the body of the microscope. The filter turret 4 is fitted with six different filters for six-stage change-over. These filers include, for example, an ND filter 4a for adjusting the brightness of the light source 1 for transmission without changing its color temperature, a compensating filter 4b for color correction. Desired filters can be alternatively inserted into and removed from the lighting optical system.

Illumination light transmitted through the filter turret 4 for transmission is guided through a transmissive aperture stop 5, condenser optical element unit 6, and condenser top lens unit 7 and applied to a specimen S on a specimen stage 8 from under the stage 8. The condenser optical element unit 6 is composed of six different condensers 6a to 6f (of which 6c to 6f are not shown) that can be alternatively inserted into and removed from the optical path. The condenser top lens unit 7 is composed of a plurality of condenser top lenses 7a and 7b that can be alternatively inserted into the optical path. Further, the specimen stage 8 can two-dimensionally move the specimen S within a plane that extends at right angles to the optical axis of the microscope and vertically move for focusing along the optical axis.

Above the specimen stage 8, moreover, a six-stage revolver 10 that can be loaded with six different objective lenses 9a to 9f (of which 9b to 9f are not shown) is removably held for rotation on the lower surface of an arm end portion (not shown) of the microscope. Any of the objective lenses 9a to 9f can be inserted into or removed from the optical path on the optical axis in the observational light path by rotating the revolver 10. Further, a cube cassette 11 is located on the optical axis on the observational light path on the upper surface of the arm end portion of the microscope. The cube cassette 11 is in the form of a four-stage turret that is loaded with four different filter cubes 11a to 11d (of which 11c and 11d are not shown). Any of the filter cubes can be alternatively inserted into and removed from the optical path by various microscopic methods.

Light transmitted through the cube 11a of the cube cassette 11 is branched in two directions by means of a beam splitter 12. One of the resulting branch light beam is guided to an eyepiece 13, and the other to a photographic optical path (not shown).

Further, light from a light source 14 for incident illumination, formed of a mercury vapor lamp, is condensed by means of a collector lens 15, and landed on an incident light filter turret 16 that is changeably attached to the microscope body (not shown). The filter turret 16, which is changeable in six stages, is fitted with six different filters 16a to 16f (of which 16c to 16f are not shown). The filter 16a is an ND filter for adjusting the brightness of the light source 14 for incident illumination without changing its color temperature, while the filter 16b is a compensating filter for color correction. Any of the filters 16a to 16f can be alternatively inserted into and removed from the optical path.

Light from the light source 14 for incident illumination is guided through the ND filter 16a, an incident aperture stop 17, and an incident field stop 18. The light is refracted downward by means of a filter cube 11a that is inserted in the optical path, and is landed on the specimen S to illuminate it through the objective lens 9a. Fluorescent light or reflected observational light from the illuminated specimen S is transmitted again through the objective lens 9a and the cube cassette 11 and branched by means of the beam splitter 12. One of the resulting branch beams is guided to the eyepiece 13, and the other to the photographic optical path (not shown).

A control section 19 and an operating section 20 shown in FIG. 1 will now be described with reference to FIG. 2.

The control section 19 is composed of a CPU 21, ROM 22, RAM 23, and nonvolatile memory 24, which are connected to one another by means of their respective CPU buses. The ROM 22 is stored with programs in which control contents are described, while the RAM 23 is loaded with data for control operation. The nonvolatile memory 24, which may be an EEPROMM, NVRAM, or flash memory, stores or reads necessary information as the programs are executed.

The operating section 20 is formed of a display element 25 and a switch input element 26, which are connected to the CPU 21. The operating section 20 delivers an operation signal from the switch input element 26 to the CPU 21, and controls position information on various driving elements 27 to 31 (mentioned later).

Further, the control section 19 is provided with an external I/F (not shown) such as an RS-232C, USB, or Ethernet. When it receives a command from an external controller such as a PC through the I/F, the control section 19 can carry out driving element control that is equivalent to operation through the operating section 20.

The following is a description of the driving elements 27 to 31.

In response to a driving signal from the control section 19, the transmissive filter turret driving element 27 rotates the transmissive filter turret 4, thereby alternatively inserting into or removing one of filters 4a to 4f from the optical path.

In response to a driving signal from the control section 19, a condenser unit driving element 28 carries out stop adjustment for the transmissive aperture stop 5, and rotates the condenser optical element unit 6 and the condenser top lens unit 7, thereby alternatively inserting into or removing the desired optical element 6a or 6b and the top lens 7a or 7b from the optical path.

In response to a driving signal from the control section 19, a revolver driving element 29 rotates the revolver 10, thereby alternatively inserting into or removing one of the objective lenses 9a to 9f from the optical path.

In response to a driving signal from the control section 19, a cube cassette driving element 30 rotates the cube cassette 11, thereby alternatively inserting into or removing one of the filter cubes 11a to 11d from the optical path.

In response to a driving signal from the control section 19, an incident filter turret driving element 31 rotates the incident filter turret 16, thereby alternatively inserting into or removing one of the filters 16a to 16f from the optical path.

Figure 3:
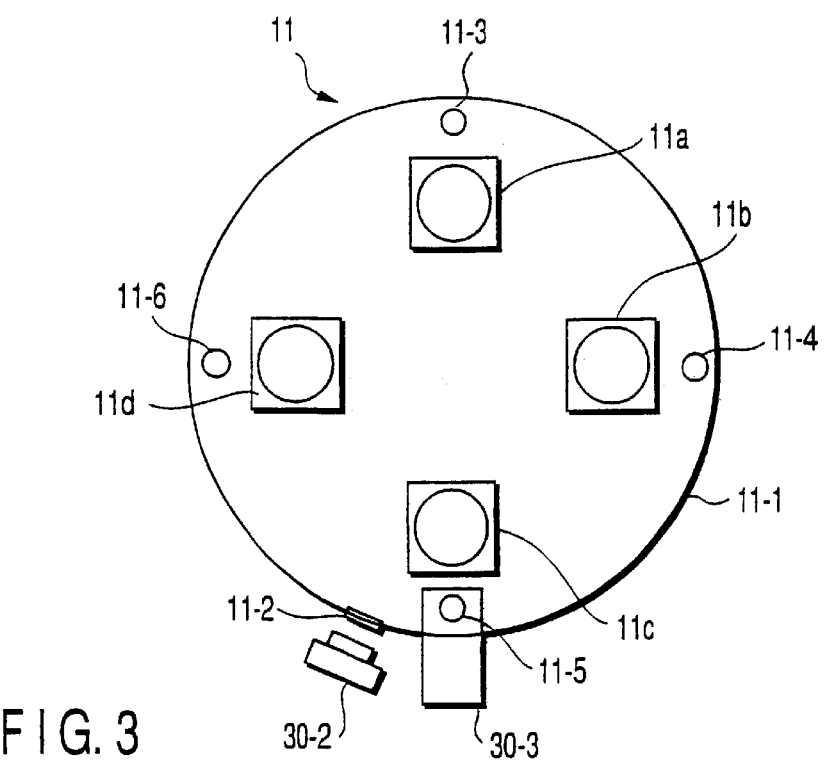
FIG. 3 is a front view of a filter cassette of the apparatus according to the first embodiment.
Figure 4:
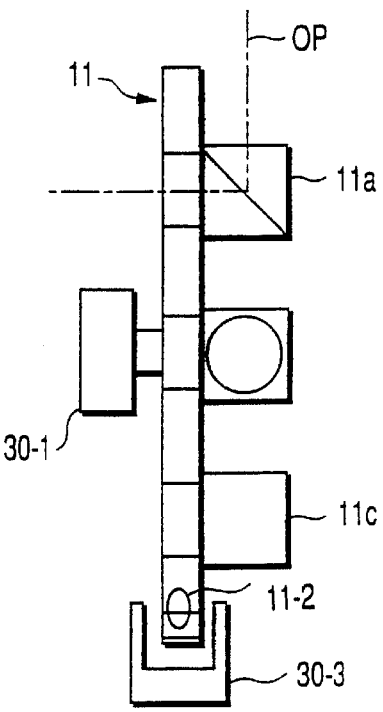
FIG. 4 is a partial side view of the filter cassette of the apparatus according to the first embodiment.

The cube cassette driving element 30 will further be described with reference to FIGS. 3 and 4. FIGS. 3 and 4 are a front view and a side view, respectively, of the cube cassette 11. In the cube cassette 11, the cubes 11a to 11d are arranged at equal spaces on the circumference of a circle on a disc 11-1. The disc 11-1 is rotated by means of a pulse motor 30-1 of the cube cassette driving element 30. A magnet 11-2 for detecting the origin position of the disc 11-1 is attached to the outer peripheral surface of the disc 11-1. A Hall element 30-2 of the cube cassette driving element 30 is located in a position opposite to the magnet 11-2. Corresponding in position to the cubes 11a to 11d, respectively, moreover, openings 11-3 to 11-6 are provided on the outer periphery of the disc 11-1. The openings 11-3 to 11-6 are used to detect positioning of the cubes 11a to 11d on an optical path OP. Held on the cube cassette driving element 30, furthermore, is a photo-interrupter 30-3, which detects the openings 11-3 to 11-6. When the filter cube 11c is located on the optical path OP, correct positioning of the cube 11c on the optical path OP can be detected by detecting the presence of the opening 11-5 by means of the photo-interrupter 30-3.

The filter turret 4, revolver 10, and incident filter turret 16, like the cube cassette 11, are provided with a magnet for origin position detection and openings for positioning detection each. Like the cube cassette driving element 30, moreover, the transmissive filter turret driving element 27, condenser unit driving element 28, and revolver driving element 29 are provided with a Hall element and a photo-interrupter each. Thus, the origin position and the optical elements that are situated on the optical path can be detected.

Figure 7:
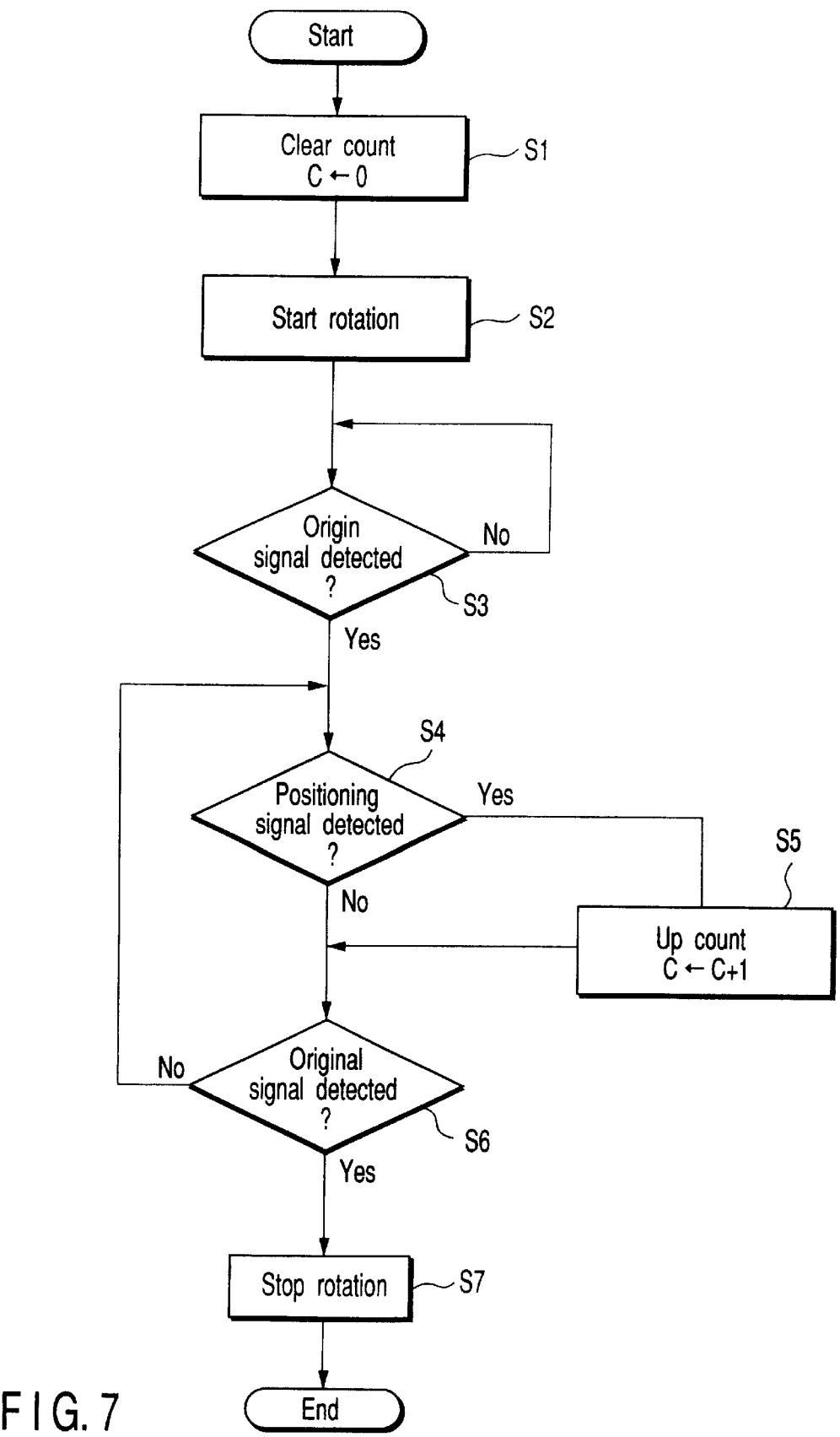
FIG. 7 is a flowchart for controlling the apparatus according to the first embodiment.

The searching operation of the cube cassette 11 will now be described with reference to the flowchart of FIG. 7.

First, the control section 19 is started to clear the count number in a counter (not shown) (C: 0; Step S1). Thereafter, the disc 11-1 is rotated by means of the cube cassette driving element 30 (Step S2). As the disc 11-1 rotates in this manner, the position of the magnet 11-2 on the disc 11-1 is detected by means of the Hall element 30-2. If the origin position of the disc 11-1 is detected by doing this (Step S3), counting detected positioning signals is started (Step S4). As the disc 11-1 further rotates so that the opening 11-5 is detected by means of the photo-interrupter 30-3, the positioning signals are detected, and the count C is upped (C: 1; Step S5).

Further, counting the positioning signals for the disc 11-1 is continued. As the disc 11-1 then rotates, the opening 11-4 reaches the photo-interrupter 30-3, whereupon the count C is upped (C: 2; Step S5). Likewise, the detected positioning signals for the openings 11-3 and 11-6 continue to be counted in succession, and the count C is upped (C: 3, C: 4; Step S5) on each occasion.

If the disc 11-1 further continues to be rotated, the magnet 11-2 that is held on the disc 11-1 is detected again by means of the Hall element 30-2 that is held in the cube cassette driving element 30, and therefore, the origin position of the disc 11-1 is detected again (Step S6), whereupon the rotation of the disc 11-1 stops (Step S7). Then, the count (C: 4) is loaded into the nonvolatile memory 24, whereupon the searching operation is finished. The number of change-over stages (four stages) of the cube cassette 11 can be detected by examining the value of the count C.

Figure 5:
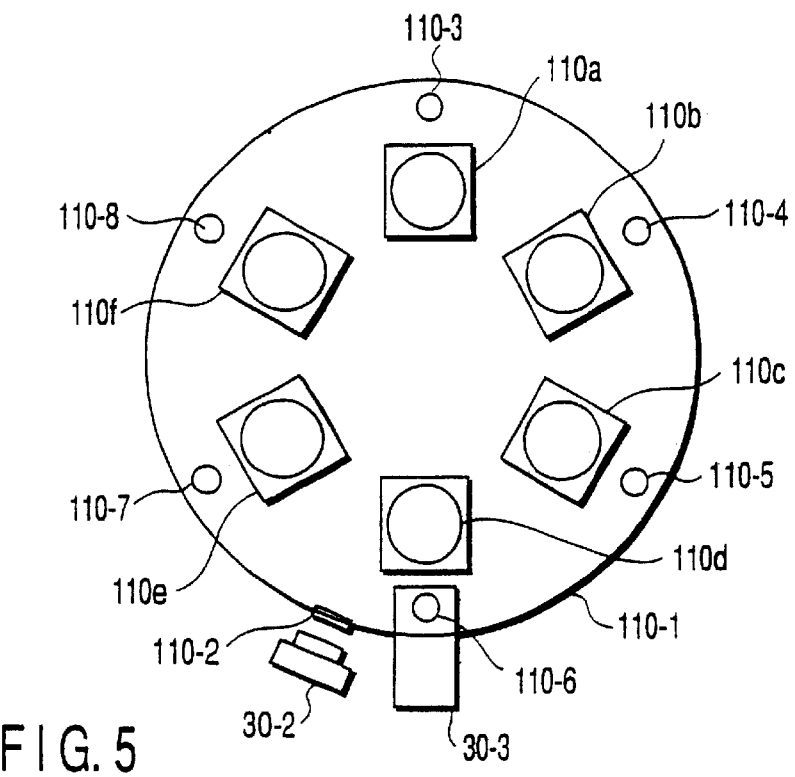
FIG. 5 is a front view of a six-stage filter cassette of the apparatus according to the first embodiment.

FIG. 5 shows a six-stage cube cassette 110 that is used in place of the cube cassette 11. Searching operation with use of the cube cassette 110 will now be described with reference to the flowchart of FIG. 7.

In the cube cassette 110, a magnet 110-2 for origin detection is attached to the peripheral edge of the disc 110-1, six different cubes 110a to 10f are placed on the disc 110-1, and openings 110-3 to 110-8 are provided corresponding to the cubes 110a to 110f, respectively.

The control section 19 starts the searching operation for the cube cassette 110. First, the count number in the counter (not shown) is cleared (C: 0; Step S1). Thereafter, the disc 110-1 is rotated by means of the cube cassette driving element 30 (Step S2). As the disc 110-1 rotates in this manner, the position of the magnet 110-2 on the disc 110-1 is detected by means of the Hall element 30-2. If the origin position of the disc 110-1 is detected by doing this (Step S3), the counter starts counting detected positioning signals (Step S4). As the disc 110-1 further rotates so that the opening 110-6 is detected by means of the photo-interrupter 30-3, the positioning signals are detected, and the count C is upped (C: 1; Step S5). Further, counting the positioning signals for the disc 110-1 is continued. If the opening 110-5 is detected by means of the photo-interrupter 30-3 as the disc 110-1 rotates, the count C is upped (C: 2; Step S5). Likewise, the opening 110-4 is detected, and the count C is upped (C: 3; Step S5). Likewise, the openings 110-3, 110-8 and 110-7 are detected, and the count C is upped (C: 4, C: 5, C: 6; Step S5).

If the rotation of the disc 110-1 is continued, moreover, the magnet 110-2 held on the disc 110-1 is detected again by means of the Hall element 30-2 that is held in the cube cassette driving element 30. Thereupon, the origin position of the disc 110-1 is detected (Step S6), and the rotation of the disc 110-1 stops (Step S7). Then, the count (C: 6) is loaded into the nonvolatile memory 24, whereupon the searching operation is finished. The number of change-over stages (six stages) of the cube cassette 11 can be detected by examining the value of the count C.

Figure 6:
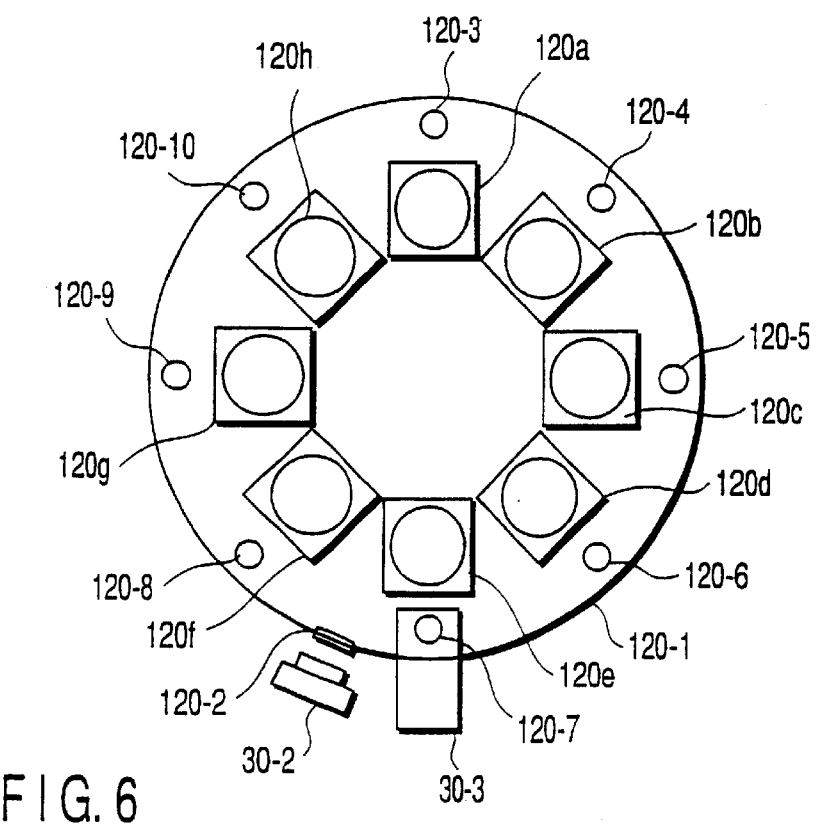
FIG. 6 is a front view of an eight-stage filter cassette of the apparatus according to the first embodiment.

FIG. 6 shows an eight-stage cube cassette 120. For searching operation in this case, the number of change-over stages (eight stages) of the cube cassette 120 can be also detected with reference to the flowchart of FIG. 7.

In the cube cassette 120, a magnet 120-2 for origin detection is attached to the peripheral edge of a disc 120-1, eight different cubes 120a to 120h are placed on the disc 120-1, and openings 120-3 to 120-10 are provided corresponding to the cubes 120a to 120f, respectively.

According to the first embodiment described above, the control can be started when the apparatus is switched on as the so-called initializing operation. If searching operation is started by a first cycle of change-over operation for the cube cassette based on the operation of the operating section 20, instead of switching the apparatus on, the searching operation can be carried out only when necessary. Thus, the time that is required by the searching operation with the power on can be saved.

In connection with the first embodiment, the cube cassettes 11, 110 and 120 have been described as components that constitute an optical element change-over control apparatus. However, searching operation for the number of change-over stages of the optical element can be also carried out with respect to replaceable transmissive filter turrets 4 and 40, revolvers 10 and 100, and incident filter turrets 16 and 160 shown in FIG. 1.

A second embodiment of the invention will now be described with reference to the flowchart of FIG. 8.

An optical element change-over control apparatus and an optical microscope using the same according to the second embodiment resemble the ones according to the first embodiment. According to the second embodiment, switches 100a and 100b are additionally used as setting members for previously setting the control section 19 or the operating section 20 to settle whether or not to execute operation for detecting the point of origin of the optical element change-over member. For example, dip switches are used as the switches 100a and 100b.

The present invention will now be described in connection with the cube cassette 11 shown in FIG. 3 with reference to the flowchart of FIG. 8.

First, the state of the switch 100a or 100b that is attached to the control section 19 or the operating section 20 is examined (Step S1). If the switch 100a or 100b is off, searching operation is not executed. In this case, the value of the count C is read from the nonvolatile memory 24 and detected as the number of change-over stages of the cube cassette (END). If the switch 100a or 100b is on, on the other hand, searching operation for the cube cassette 11 is started. After the control section 19 is started to clear the count number in the counter (not shown) (C: 0; Step S2), the disc 11-1 is rotated by means of the cube cassette driving element 30 (Step S3). As the disc 11-1 rotates in this manner, the position of the magnet 11-2 on the disc 11-1 is detected by means of the Hall element 30-2. If the origin position of the disc 11-1 is detected by doing this (Step S4), counting the positioning signals is started (Step S5). As the disc 11-1 further rotates so that the opening 11-5 is detected by means of the photo-interrupter 30-3, the positioning signals are outputted, and the count C is upped (C: 1; Step S6). Further, counting the positioning signals for the disc 11-1 is continued. If the opening 11-4 is detected by means of the photo-interrupter 30-3 as the disc 11-1 rotates, the count C is upped (C: 2; Step S6). Likewise, the positioning signals for the openings 11-3 and 11-6 continue to be counted in succession, and the count C is upped (C: 3, C: 4; Step S6) on each occasion.

If the disc 11-1 further continues to be rotated, the magnet 11-2 that is held on the disc 11-1 is detected again by means of the Hall element 30-2 that is held in the cube cassette driving element 30, and therefore, the origin position of the disc 11-1 is detected (Step S7), whereupon the rotation of the disc 11-1 stops (Step S8). Then, the value of the count C (C: 4) is loaded into the nonvolatile memory 24, whereupon the searching operation is finished (END). The number of change-over stages (four stages) of the cube cassette 11 can be obtained by examining the value of the count C.

The following is a description of optical element searching operation with use of the six-stage cube cassette 110 of FIG. 5 in place of the cube cassette 11.

First, the state of the switch 100a or 100b that is attached to the control section 19 or the operating section 20 is examined (Step S1). If the switch 100a or 100b is off, searching operation is not executed. In this case, the count is read from the nonvolatile memory 24, and its value is detected as the number of change-over stages of the cube cassette (END). If the switch 100a or 100b is on, on the other hand, searching operation for the cube cassette 110 is started. After the count number in the counter (not shown) is first cleared (C: 0; Step S2), the disc 110-1 is rotated by means of the cube cassette driving element 30 (Step S3). As the disc 110-1 rotates in this manner, the position of the magnet 110-2 on the disc 110-1 is detected by means of the Hall element 30-2. If the origin position of the disc 110-1 is detected by doing this (Step S4), the counter starts counting the positioning signals. As the disc 110-1 is further rotated so that the opening 110-6 is detected by means of the photo-interrupter 30-3, the positioning signals are outputted, and the count C is upped (C: 1; Step S5). Further, counting the positioning signals for the disc 110-1 is continued. If the opening 110-5 is detected by means of the photo-interrupter 30-3 as the disc 110-1 rotates, the count C is upped (C: 2; Step S5). Likewise, the count C is upped (C: 3; Step S5) as the opening 110-4 is detected by means of the photo-interrupter 30-3. Likewise, moreover, the count C is upped (C: 4, C: 5, C: 6; Step S6) as the openings 110-3, 110-8 and 110-7 are detected in succession by means of the photo-interrupter 30-3.

If the disc 110-1 further continues to be rotated, the magnet 110-2 that is held on the disc 110-1 is detected again by means of the Hall element 30-2 that is held in the cube cassette driving element 30, and therefore, the origin position of the disc 110-1 is detected (Step S7), whereupon the rotation of the disc 110-1 stops (Step S8). Then, the value of the count C (C: 6) is loaded into the nonvolatile memory 24, whereupon the searching operation is finished.

The number of change-over stages (six stages) of the cube cassette 110 can be detected by examining the value of the count C.

Figure 8:
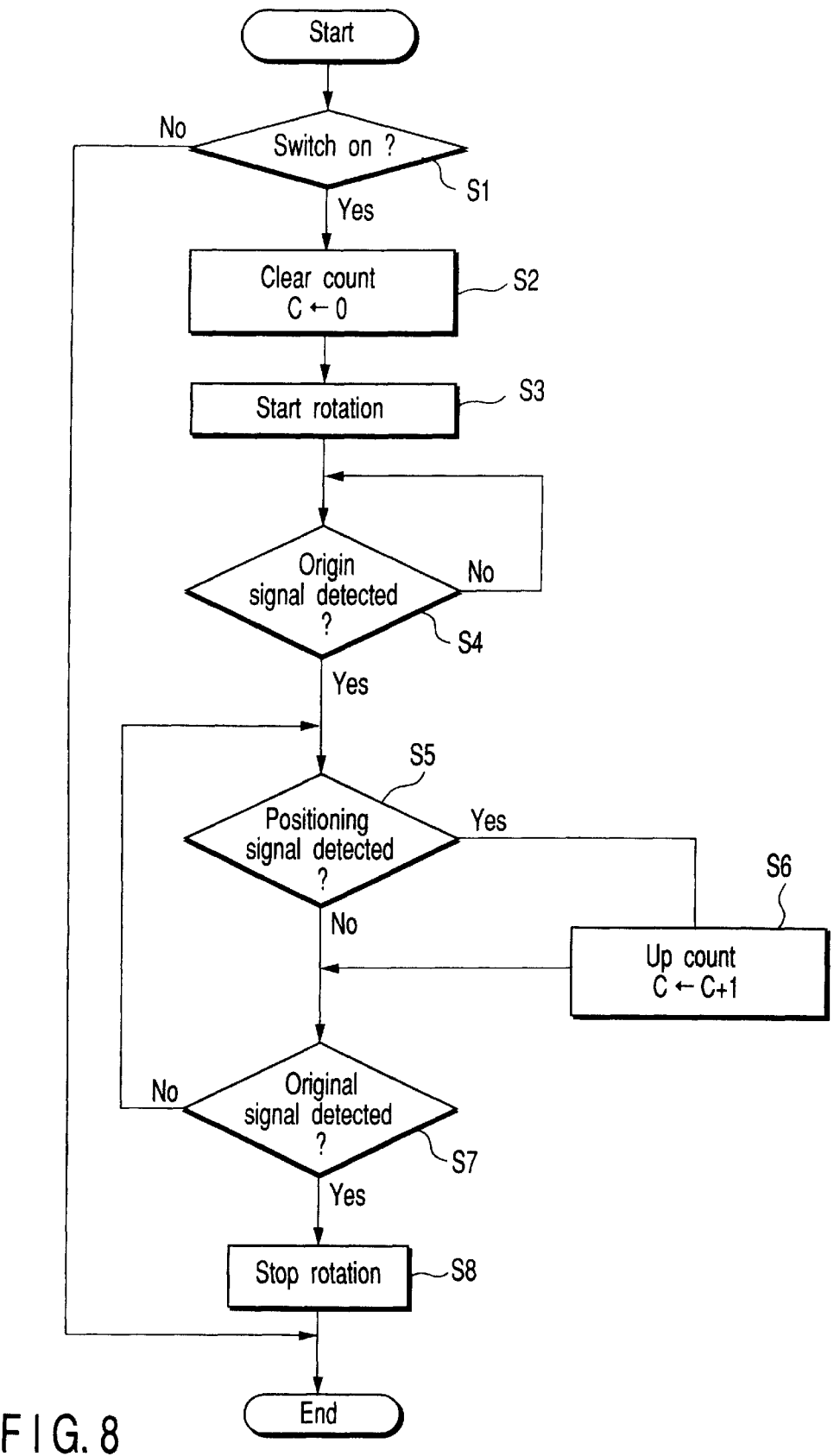
FIG. 8 is a flowchart for controlling an apparatus according to a second embodiment of the invention.

For searching operation for the eight-stage cube cassette 120 shown in FIG. 6, the number of change-over stages (eight stages) of the cube cassette 120 can be also detected with reference to the flowchart of FIG. 8.

The control according to second embodiment described above, like the control according to first embodiment, can be started when the apparatus is switched on as the so-called initializing operation. If searching operation is started by a first cycle of change-over operation for the cube cassette based on the operation of the operating section 20, instead of switching the apparatus on, the searching operation can be carried out only when necessary. Thus, the time that is required by the searching operation with the power on can be saved.

In connection with the second embodiment, the cube cassettes 11, 110 and 120 have been described as components that constitute the optical element change-over control apparatus. However, the number of change-over stages can be also detected by means of the change-over control apparatus with respect to the transmissive filter turrets 4 and 40, revolvers 10 and 100, and incident filter turrets 16 and 160 shown in FIG. 1.

According to the present invention, the optical element unit to be attached to the microscope body can be replaced. If the number of change-over stages is changed, therefore, the control function need not be changed at all. Thus, the microscope can be smoothly operated by detecting the number of change-over stages of the newly set optical element unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical element change-over control apparatus comprising:

an optical element change-over member capable of holding a plurality of optical elements and rotating alternatively to locate a specific optical element on an optical path;

a driving element for rotating the optical element change-over member;

a positioning detecting element for detecting the selected optical element being positioned so that the optical element stays in a predetermined position on the optical path and outputting positioning signals;

an origin detecting element for detecting the point of origin of the optical element change-over member; and a control element for driving the driving element to rotate the optical element change-over member and counting the positioning signals delivered from the positioning detecting element during the time interval that elapses from the instant that the point of origin of the optical element change-over member is first detected by means of the origin detecting element until the point of origin of the optical element change-over member is secondly detected by means of the origin detecting element, thereby detecting the number of change-over stages of the optical element change-over member.

2. An optical element change-over control apparatus according to claim 1, wherein said optical element change-over member is any one of elements including a revolver, cube cassette, filter turret, and condenser unit.

3. An optical element change-over control apparatus according to claim 1, further comprising a setting member for previously setting whether or not to execute operation for detecting the number of change-over stages of the optical element change-over member.

4. An optical element change-over control apparatus according to claim 1, wherein said operation for detecting the point of origin of the optical element change-over member is executed when the apparatus is switched on as initializing operation or when the optical element change-over member is subjected to a first cycle of change-over operation.

5. A microscopic apparatus using an optical element change-over control apparatus, the optical element change-over control apparatus comprising:

an optical element change-over member capable of holding a plurality of optical elements and rotating alternatively to locate a specific optical element on an optical path;

a driving element for rotating the optical element change-over member;

a positioning detecting element for detecting the selected optical element being positioned so that the optical element stays in a predetermined position on the optical path and outputting positioning signals;

an origin detecting element for detecting the point of origin of the optical element change-over member; and a control element for driving the driving element to rotate the optical element change-over member and counting the positioning signals delivered from the positioning detecting element during the time interval that elapses from the instant that the point of origin of the optical element change-over member is first detected by means of the origin detecting element until the point of origin of the optical element change-over member is secondly detected by means of the origin detecting element, thereby detecting the number of change-over stages of the optical element change-over member.

6. A microscopic apparatus according to claim 5, wherein said optical element change-over member is any one of elements including a revolver, cube cassette, filter turret, and condenser unit.

7. A microscopic apparatus according to claim 5, further comprising a setting member for previously setting whether or not to execute operation for detecting the number of change-over stages of the optical element change-over member.

8. A microscopic apparatus according to claim 5, wherein said operation for detecting the point of origin of the optical element change-over member is executed when the apparatus is switched on as initializing operation or when the optical element change-over member is subjected to a first cycle of change-over operation.

9. A method for detecting the number of change-over stages of an optical element change-over member capable of holding a plurality of optical elements and rotating alternatively to locate a specific optical element on an optical path, the method comprising:

a member rotating step of driving a driving element to rotate the optical element change-over member;

a first origin position detecting step of detecting the origin position of the optical element change-over member by means of an origin detecting element;

a positioning signal detecting step of determining whether or not a positioning signal, indicative of the selected optical element being positioned so that the optical element stays in a predetermined position on the optical path, is detected after the origin position is detected and incrementing a count value indicative of the number of change-over stages of the optical element change-over member by one every time the positioning signal is detected; and a second origin position detecting step of determining whether or not the origin position of the optical element change-over member is detected again during the execution of the positioning signal detecting step and stopping the rotation of the optical element change-over member when the origin position is detected.

10. A method for detecting the number of change-over stages of an optical element change-over member according to claim 9, further comprising a step of previously setting whether or not to execute operation for detecting the number of change-over stages of the optical element change-over member.

* * * * *